United States Patent
Tochika

(10) Patent No.: US 8,980,980 B2
(45) Date of Patent: Mar. 17, 2015

(54) RUBBER COMPOSITION FOR PNEUMATIC TIRE

(75) Inventor: Shinya Tochika, Osaka (JP)

(73) Assignee: Toyo Tire & Rubber Co., Ltd., Osaka-shi (JP)

( * ) Notice: Subject to any disclaimer, the term of this patent is extended or adjusted under 35 U.S.C. 154(b) by 248 days.

(21) Appl. No.: 13/365,849

(22) Filed: Feb. 3, 2012

(65) Prior Publication Data

US 2012/0232192 A1 Sep. 13, 2012

(30) Foreign Application Priority Data

Mar. 9, 2011 (JP) ................................. 2011-051544

(51) Int. Cl.
| | |
|---|---|
| *B60C 1/00* | (2006.01) |
| *C08L 21/00* | (2006.01) |
| *C08L 7/00* | (2006.01) |
| *C08L 1/02* | (2006.01) |

(52) U.S. Cl.
CPC ................. *B60C 1/0016* (2013.01); *C08L 1/02* (2013.01); *C08L 21/00* (2013.01); *C08L 7/00* (2013.01)
USPC ........................................................... 524/45

(58) Field of Classification Search
CPC ......... B60C 1/0016; C08L 21/00; C08L 7/00; C08L 1/02
USPC .............................................................. 524/45
See application file for complete search history.

(56) References Cited

U.S. PATENT DOCUMENTS 6,084,022 A * 7/2000 Blok et al. ..................... 524/526
2011/0114241 A1* 5/2011 Unseld et al. .................. 152/564

FOREIGN PATENT DOCUMENTS

JP 2002-249619 A 9/2002

\* cited by examiner

*Primary Examiner* — Angela C Scott
(74) *Attorney, Agent, or Firm* — Westerman, Hattori, Daniels & Adrian, LLP

(57) ABSTRACT

A rubber composition for a tire, in particular for a tread rubber part of a studless tire, comprising: diene rubber component consisting of natural rubber and/or other diene rubber; powder of hydrophilic modified cellulose amounting 0.1-30 mass parts relative to 100 mass parts of the diene rubber component. In preferred embodiments, the hydrophilic modified cellulose has degree of etherification in a range of 0.2-1.0 and its powder has average particle size in a range of 20 μm to 100 μm.

11 Claims, 2 Drawing Sheets

RUBBER COMPOSITION FOR PNEUMATIC TIRE

BACKGROUND OF THE INVENTION

The present invention relates to a rubber composition for a pneumatic tire. In particular, the invention relates to a rubber composition that is preferably adoptable in forming a tread rubber part of a studless tire, especially for automobiles such as four-wheel vehicles.

Various efforts and devising have been made and incorporated into the tread rubber part of the studless tire so as to improve contacting between the tread rubber part and ice-covering road surface. For example, the tread rubber part is devised as adjusted to have low rubber hardness at low temperature at near or under 0° C. Moreover, in order to increase tire-tread's friction with the ice covering road surface, there have been proposed to add foamed rubber, hollow particles, glass fibers, lignocellulosic particles such as walnut shell powder, or the like, to the rubber composition for the tread rubber part. These are to achieve scratching on the ice and/or utilizing of undulation caused by dropping out of hard particles or fibers on way of proceeding with wearing away of the tread rubber part. Further, there have been also adopted a method of increasing fillers and oils so as to improve braking performances on wet road and ice-covered road surface. Such method is disadvantageous in increases of rolling resistance (heat generation) and wear resistance of the tire tread rubber part.

JP2002-249619A (Japan patent application publication No. 2002-249619) proposes adding of glass fiber strands or other strands, particles of lignocellulosic or cellulosic materials such as used papers or rice husks so as to achieve removing of water film on the road surface by way of holes or recesses formed by dropping out the fibers or particles. This method is disadvantageous in that high braking performances on wet road and ice-covered road are difficult to be stably maintained and in that wear resistance is decreased due to difficulty in uniform dispersion of the strands or the particles.

In view of the above, it is aimed to provide a rubber composition for a pneumatic tire, which enables to improve contacting of the tire tread, as well as braking performance, on the wet or ice-covering road surface while avoiding increase of wearing out and rolling resistance (heat generation).

BRIEF SUMMARY OF THE INVENTION

According to the invention, a rubber composition for a pneumatic tire comprises: a diene rubber component consisting of natural rubber and/or other diene rubber; and hydrophilic modified cellulose that is added by 0.1-30 mass parts to 100 mass parts of the diene rubber component. Carboxymethyl cellulose is preferably used as the modified cellulose.

A pneumatic tire obtainable by using the rubber composition according to the invention, enables efficient removing of water film on the wet or ice-covered road surface. Thus, braking performances on wet road and ice-covered road are increased while avoiding increase of wearing out and rolling resistance of the tire.

DETAILED DESCRIPTION OF THE INVENTION

Figure 1:
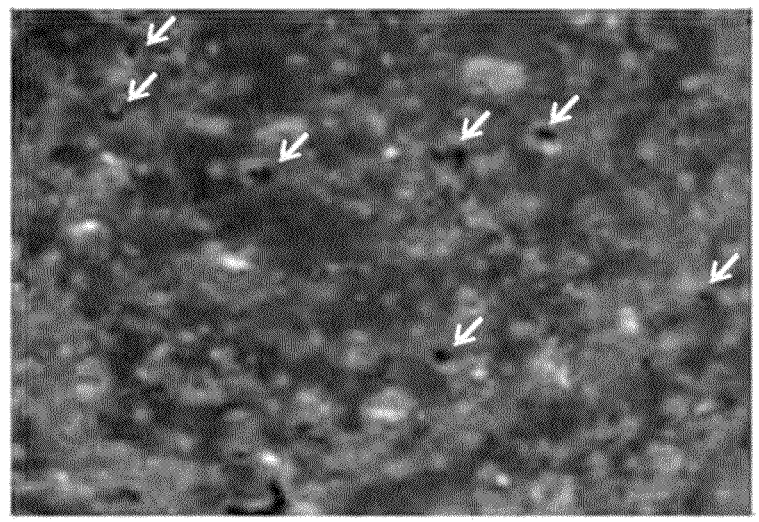
FIGS. 1-2 are microscopic photographs on cut-through surfaces of vulcanized samples of Example 1, respectively for first and second lots of the vulcanized samples.

Hereafter, preferred embodiments of the invention are described in detail.

The hydrophilic modified cellulose, which is used in the rubber composition according to the invention, is chemically modified cellulose, in which hydrogen atom of hydroxyl groups in the cellulose are substituted by other groups, in an adequate extent. In particular, the hydrophilic modified cellulose is cellulose ether, in which hydrogen bonding is curbed by etherification of hydroxyl groups. Examples of substituting groups are: alkyl groups such as methyl group; hydroxy-alkyl groups such as hydroxy-ethyl and hydroxy-propyl groups; carboxy-alkyl groups such as carboxy-methyl and carboxy-ethyl groups, to name a few. The hydrophilic modified cellulose may be one having two or more kinds of ether groups, such as methyl hydroxy-ethyl cellulose.

Cellulose has a plenty of hydroxyl groups and thus is aggregated in water or in aqueous solution due to strong hydrogen bonding of the hydroxyl groups with each other, between molecules of the cellulose. By curbing the hydrogen bonding between the hydroxyl groups, aggregation of the cellulose is curbed, and thus such modified cellulose is in a powder form and has a good dispersibility in aqueous liquid. Such modified cellulose in powder form is considered to also have good compatibility with and good dispersibility in rubber.

Degree of etherification or degree of substitution (DS) of the above-mentioned modified cellulose is in a range of 0.1 to 3.0, usually in a range of 0.1 to 2.5, preferably in a range of 0.2 to 1.5, more preferably in a range of 0.25 to 1.0, still more preferably in a range of 0.2 to 0.9 and especially in a range of 0.2 to 0.8 or of 0.2 to 0.7. If the degree of etherification is less than 0.1, dispersibility and hydrophilicity of the modified cellulose would tend to become insufficient. If the degree of etherification is more than 1.0 or 1.5, fibrous shaping of the cellulose raw materials (which are usually wood-pulp-derived dissolving pulps or refined linters) would become diminished or disappeared and become converted to granule form with increase of the etherification degree. Thus, dispersibility and actual or effective water absorbing capacity would become decreased, and therefore, water-film removing capacity would become difficult to achieve.

The degree of etherification may be measured, in case of methyl cellulose, by NMR method, after methoxy acetylation or the like of not-substituted hydroxyl groups. In case of sodium salts or the like of carboxymethyl cellulose, the degree of etherification is easily measurable by incineration and subsequent neutralization titration. The hydrophilic modified cellulose is produced, according to industrial processes, from fibrous cellulose raw materials such as dissolving pulp derived from wood and refined cotton linter, by following. The cellulose raw material is pulverized, then added with alkali and reacted in water-containing organic solvent, with etherification agent such as methyl chloride and monochloro acetic acid; and then is subjected to neutralization, desalting, drying, and pulverizing and gradation, or the like. Thus, etherification of cellulose proceeds heterogeneously; and cellulose ether product having relatively low degree of substitution, especially at no more than 0.5, is considered to have higher degree of substitution at surface of powder particle than in core part of the powder particle. The hydrophilic cellulose ether is hygroscopic and usually has a water content no more than 10% (mass %) and usually in a range of 2 to 8%. In this application, amount of addition or charging is expressed on basis of absolute-dry mass, which is obtainable by drying at 105° C. for 4 hours for example.

Viscosity of 1% aqueous solution of the hydrophilic modified cellulose is preferably in a range of 5 to 1000 mPa·sec, more preferably in a range of 10 to 350 mPa·sec and still more preferably in a range of 10 to 200 mPa·sec. The viscosity may be measured by a Tokimec BM viscometer (a kind of Brookfield viscometer) at 25° C., by reading a value 60 seconds after starting of rotation of a rotor.

General industrial products of carboxymethyl cellulose is in a form of sodium salts whereas the carboxymethyl cellulose may be in a form of potassium salts or ammonium salts and possibly be in an acid form in certain situations. Examples of the products of carboxymethyl cellulose are products of Nippon Paper Chemicals Co., Ltd., such as SUNROSE F01MC (DS 0.7; 1% viscosity 10 mPa·sec), SUNROSE F10MC (DS 0.7; 1% viscosity 100 mPa·sec), SUNROSE F30MC (DS 0.7; 1% viscosity 300 mPa·sec), SUNROSE F01LC (DS 0.6; 1% viscosity 10 mPa·sec), SUNROSE F10LC (DS 0.6; 1% viscosity 100 mPa·sec), SUNROSE F10LC (DS 0.6; 1% viscosity 200 mPa·sec) and SUNROSE SLD (DS 0.25; 1% viscosity 100 mPa·sec), to name a few as preferable ones. Examples of preferably adoptable methyl cellulose products are of METROSE SR series, products of Shin-Etsu chemicals Co., Ltd.

The modified cellulose is in a powder form and preferably have an average diameter (mass-average diameter) of particles in a range of 20 μm to 100 μm. When the average diameter is less than 20 μm (635 mesh opening), dispersibility would tend to become insufficient. When the average diameter is more than 100 μm (165 mesh opening), compatibility with rubber would tend to become insufficient and thus wear resistance of tire would tend to become decreased. The mass average diameter means that obtained from results of sieve gradation, throughout the specification.

In a rubber composition according to the invention, the hydrophilic modified cellulose is added in a range of 0.1 to 30 mass parts, preferably in a range of 1 to 30 mass parts, more preferably in a range of 2 to 25 mass parts, still more preferably in a range of 2 to 15 mass parts, further preferably in a range of 5 to 15 mass parts; to 100 mass parts of the diene rubber component consisting of natural rubber and/or other diene rubber. When amount of the modified cellulose is less than 0.1 mass part, effect of removing water film would not be achieved. When the amount is more than 30 mass parts, wear resistance would be remarkably decreased.

When the modified cellulose having preferred degree of etherification is added into the rubber composition, dispersity of the modified cellulose in the rubber composition would be good, and hence, wear resistance of a tire would be improved or maintained. Moreover, because of high water absorbing capacity of such modified cellulose, water film on wet or ice-covered road surface would be sucked or removed, and hence, excellent braking performance would be achieved. Further, when the modified cellulose is used along with fillers such as silica powder, the modified cellulose would also take a role as dispersing agent for the fillers.

When the hydrophilic modified cellulose is added into the rubber composition, it is recognized that uniform and fine microvoids having average diameters (mass average diameters) in a range of 20 μm to 80 μm, particularly in a range of 30 μm to 70 μm and, for example, roughly in a range of 40 μm to 50 μm are formed in the rubber, even with no foaming agent. The microvoids in a built-up tire are considered to contribute in absorbing or removing of water, and in forming edges or ridges or the like, so as to contribute in maintaining excellent braking performances on wet road and ice-covered road. In other words, the hydrophilic modified cellulose such as carboxymethyl cellulose has high hygroscopicity; and hence water at inside of the powder particles would not be completely removed during kneader-mixing processes and portion of water is considered to remain until vulcanization molding process.

Except for including the modified cellulose, the rubber composition according to the invention may adopt formulations or compositions in accordance with those of conventional rubber compositions for the pneumatic tire, with some modifications if necessary.

The diene rubbers that are adoptable as the diene rubber component in the rubber composition according to the invention are: natural rubber (NR), polyisoprene rubber (IR), styrene-butadiene rubber (SBR), polybutadiene rubber (BR) and the like, to name a few. Only one of them or any combination of two or more maybe adoptable as the diene rubber component. Preferably, natural rubber (NR) and/or polyisoprene rubber (IR) are adopted.

As the fillers, carbon black and/or silica powder may be adopted. Amount of adding them to 100 mass parts of the diene rubber component is preferably in a range of 25 to 125 mass parts, more preferably in a range of 30 to 80 mass parts.

Examples of adoptable silica powder are wet-process silica (hydrated silicate) powder, dry-process silica (anhydrous silicate) powder, calcium silicate powder, calcium aluminate or the like. Among them, the wet-process silica powder is preferable.

When the silica powder is adopted, silane coupling agent such as sulfide silanes and mercapto silanes is preferably added into the rubber composition by 5-15 mass % of the silica powder.

Further to the above, the rubber composition according to the invention may include various additives that are conventionally used in the rubber composition for tire, such as zinc white, stearate, antioxidants, wax, vulcanizing agent, vulcanizing accelerators and the like. Examples of adoptable vulcanizing agent are sulfur and sulfur-containing compounds. Addition amount of the vulcanizing agent is preferably in a range of 0.1 to 10 mass parts, more preferably in a range of 0.5 to 5 mass parts, to 100 mass parts of the diene rubber component. Addition amount of the vulcanizing accelerator is preferably in a range of 0.1 to 7 mass parts, more preferably in a range of 0.5 to 5 mass parts, to 100 mass parts of the diene rubber component. The rubber composition may be prepared by using an ordinary rubber kneader device such as a Banbury mixer and a rubber kneader with mixing blades, in accordance with conventional formulations or methods.

The rubber composition formulated as in the above is adoptable in forming a tread rubber part of the tire; and the tire is obtainable by vulcanization at a temperature in a range of 140 to 180° C. for example. The tire according to the invention may be formed by use of the rubber composition according to the invention, and by a conventional method.

Examples

Examples according to the invention are given below whereas the invention is no way to be limited to these examples. A Banbury mixer was used as a kneader device. Charging and mixing of materials are made in accordance with formulations (expressed in mass parts) shown in Table 1 at below. In first mixing step, all the materials except for the vulcanizing agent and accelerator were charged and mixed in the mixer. The vulcanizing agent and accelerator were added in final mixing step to prepare the rubber composition for the tire. Details of materials shown in the Table 1 are indicated at below.

Natural rubber: RSS #3,
Butadiene rubber (BR): "BR01", a product of JSR Corporation ("high cis BR" having cis-1,4 contents of about 95%),
SBR-1: "SSBR VSL5025", a product of LANXESS Corporation (solution-polymerized styrene-butadiene rubber),
SBR-2: "ESBR SBR1502", a product of JSR Corporation (emulsion polymerized styrene-butadiene rubber),
Carbon Black: "N339 SEAST KH", a product of Tokai Carbon Co., Ltd. (HAF-HS class),
Silica: "Nipsil AQ", a product of Tosoh Co., Ltd.,
Silane coupling agent: "Si69", a product of Evonik Degussa GmbH;
Oil (paraffin oil): "process P200", a product of JX Nippon Sun-Energy Corporation,
Non-modified cellulose: "KC flock W-50", a product of Nippon Paper Chemicals Co., Ltd. (average particle size is about 50 μm),
Modified cellulose (CMC-1): "SUNROSE SLD-F1", a product of Nippon Paper Chemicals Co., Ltd. (carboxymethyl cellulose (CMC); etherification degree of 0.25, 1% viscosity of about 100 mPa·sec, average particle size is about 50 μm),
Modified cellulose (CMC-2): "SUNROSE F10MC", a product of Nippon Paper Chemicals Co., Ltd. (carboxymethyl cellulose (CMC); etherification degree of 0.7, 1% viscosity of about 100 mPa·sec, average particle size is about 50 μm),
Stearic acid: "Lunac S-20", a product of NOF Corporation,
Zinc white: "Zinc white No. 3", a product of Mitsui Mining & Smelting Co., Ltd.,
Sulfur: "5% oil treated powder sulfur 5%", a product of Tsurumi Chemical Industry Co., Ltd.,
Vulcanization accelerator: "Nocceler NS-G", a product of Ouchi Shinko Chemical Industrial Co., Ltd.

The rubber composition of each examples and comparative examples is evaluated by following test methods, after forming a tire for testing by vulcanization molding at 150° C. for 30 minutes. Obtained results are also shown in the Table 1, as expressed as "index" or ratio by assuming a value of comparative example 1 as 100, except for "Hardness".

Hardness: Hardness of the tire was measured by using Durometer Type A in line with JIS K 6253, at 23° C. and at −5° C.

Wear resistance: The tire for testing was mounted on a four-wheel-driving passenger car, was switched between right-hand and left-hand sides at every 2500 km of travelling distance. After travelling of 10,000 km, depths of four major grooves as remained on the tire were measured, and then, average of them was obtained. The larger the index is, the better the wear resistance is.

Rolling resistance: The tire for testing was mounted on a rolling road drum device for measuring the rolling resistance. Measurement was made by running the tire on the rolling road drum, at tire's inner pressure of 230 kPa, at load of 4.4 kN, at room temperature of 23° C. and at running speed of 80 km/h. Reciprocal of each of the obtained values of the rolling resistance was taken and was expressed as the index. Thus, the larger the index is, the smaller the rolling resistance is, and hence, the better the rolling resistance performance is.

Braking performance on ice-covered-road: The tire for testing was mounted on a front-engine front-wheel-drive passenger car having 2000 cc engine on front side. The car was run on the ice-floe-covered road of test course, at atmospheric temperature of −3±3° C.; and an anti-lock braking system (ABS) was mobilized at travelling speed of 40 km/h, and then, distance needed for stopping or braking distance was measured. The larger the index is, the shorter the braking distance is, and hence, the better the braking performance is.

Braking performance on wet-road: The car on the above was run on wet road of test course; and an anti-lock braking system (ABS) was mobilized at travelling speed of 90 km/h, and then, distance needed for slowing down to 20 km/h was measured.

The larger the index is, the shorter the braking distance is, and hence, the better the braking performance is.

TABLE 1

|  | Ex. 1 | Ex. 2 | Ex. 3 | Ex. 4 | Ex. 5 | Ex. 6 | Ex. 7 | Ex. 8 | Ex. 9 | Ex. 10 | Com. Ex. 1 | Com. Ex. 2 | Com. Ex. 3 |
|---|---|---|---|---|---|---|---|---|---|---|---|---|---|
| NR | 50 | 50 | 50 | 50 | 50 | 50 | 50 | 50 |  |  | 50 | 50 |  |
| BR | 50 | 50 | 50 | 50 | 50 | 50 | 50 | 50 |  |  | 50 | 50 |  |
| SBR-1 |  |  |  |  |  |  |  |  | 60 | 60 |  |  | 60 |
| SBR-2 |  |  |  |  |  |  |  |  | 40 | 40 |  |  | 40 |
| Carbon black | 25 | 25 | 25 | 25 | 25 | 25 | 20 | 20 | 45 | 45 | 25 | 25 | 45 |
| Silica powder | 25 | 25 | 25 | 25 | 25 | 25 | 25 | 20 | 45 | 45 | 25 | 25 | 45 |
| Coupling agent | 2.0 | 2.0 | 2.0 | 2.0 | 2.0 | 2.0 | 2.0 | 2.0 | 4 | 4 | 2.0 | 2.0 | 4 |
| Oil | 20 | 20 | 20 | 20 | 20 | 20 | 20 | 20 | 40 | 40 | 20 | 20 | 40 |
| Non-modified Cellulose |  |  |  |  |  |  |  |  |  |  |  | 2 |  |
| CMC-1 (DS 0.25) | 2 | 10 | 25 |  |  |  | 10 | 10 | 10 |  |  |  |  |
| CMC-2 (DS 0.7) |  |  |  | 2 | 10 | 25 |  |  |  | 10 |  |  |  |
| Stearate | 2 | 2 | 2 | 2 | 2 | 2 | 2 | 2 | 2 | 2 | 2 | 2 | 2 |
| Zinc white | 2 | 2 | 2 | 2 | 2 | 2 | 2 | 2 | 2 | 2 | 2 | 2 | 2 |
| Antioxidant | 2 | 2 | 2 | 2 | 2 | 2 | 2 | 2 | 2 | 2 | 2 | 2 | 2 |
| Wax | 2 | 2 | 2 | 2 | 2 | 2 | 2 | 2 | 2 | 2 | 2 | 2 | 2 |
| Accelerator | 1.5 | 1.5 | 1.5 | 1.5 | 1.5 | 1.5 | 1.5 | 1.5 | 1.5 | 1.5 | 1.5 | 1.5 | 1.5 |
| Sulfur | 2.1 | 2.1 | 2.1 | 2.1 | 2.1 | 2.1 | 2.1 | 2.1 | 2.1 | 2.1 | 2.1 | 2.1 | 2.1 |
| Hardness 23° C. | 49 | 51 | 53 | 49 | 51 | 52 | 49 | 50 | 68 | 67 | 48 | 49 | 65 |
| Hardness −5° C. | 50 | 52 | 54 | 50 | 52 | 53 | 50 | 51 | 71 | 71 | 49 | 50 | 69 |
| Wear resistance | 99 | 99 | 95 | 101 | 102 | 95 | 97 | 98 | 99 | 100 | 100 | 90 | 100 |

TABLE 1-continued

|  | Ex. 1 | Ex. 2 | Ex. 3 | Ex. 4 | Ex. 5 | Ex. 6 | Ex. 7 | Ex. 8 | Ex. 9 | Ex. 10 | Com. Ex. 1 | Com. Ex. 2 | Com. Ex. 3 |
|---|---|---|---|---|---|---|---|---|---|---|---|---|---|
| Rolling resistance | 102 | 103 | 101 | 103 | 102 | 99 | 107 | 106 | 104 | 102 | 100 | 98 | 100 |
| Braking performance on ice-coverd road | 107 | 115 | 116 | 107 | 118 | 118 | 119 | 118 | 114 | 116 | 100 | 101 | 100 |
| Braking performance on wet-road | 102 | 105 | 106 | 104 | 107 | 108 | 104 | 103 | 106 | 107 | 100 | 101 | 100 |

As seen from results in Table 1, the tires obtained by the rubber compositions of the Examples were revealed as excellent in each of the wear-resistance, rolling-resistance, braking performances on ice-covered-road and wet-road, with good balance or proportions among them.

Especially, the braking performance on ice-covered-road was remarkably improved and the braking performance on wet-road was also improved while the wear resistance was virtually maintained. No matter whether a carboxymethyl cellulose (CMC-1) having DS of 0.25 was used as in Examples 1-3, or a carboxymethyl cellulose (CMC-2) having DS of 0.7 was used as in Examples 4-6; the braking performance on ice-covered-road obtained by 10 phr addition was remarkably higher than that obtained by 2 phr addition, and the braking performance on wet road obtained by 10 phr addition was higher than that obtained by 2 phr addition. Moreover, the rolling-resistance obtained by 10 phr addition seemed to be higher than that obtained by 2 phr addition. Nevertheless, 25 phr addition as in Examples 3 and 6 made almost no difference with 10 phr addition and caused deterioration in the wear resistance. In view of this, addition amount of carboxymethyl cellulose was considered to be optimum at around 10 phr. Meanwhile, although difference due to DS is not so remarkable, the carboxymethyl cellulose (CMC-1) having DS of 0.7 seemed to be slightly more excellent than the carboxymethyl cellulose (CMC-2) having DS of 0.25, in overall performances. Especially, by adding 10 phr of the carboxymethyl cellulose (CMC-1) of DS of 0.7, the wear resistance was slightly improved than the Comparative example 1, in which no addition of carboxymethyl cellulose was made.

Meanwhile, in Examples 7 and 8, amount of fillers was slightly decreased from 50 phr of Examples 1 to 6 and other formulation was set to be respectively same with Examples 2 and 5. Thus obtained results were almost same with those of Examples 2 and 5 while showing some improvement in the rolling resistance and, in same time, some deterioration in the wear resistance. In Examples 9 and 10, only SBR was used as the diene rubber component, and total amount of the fillers is set to be 90 phr. Resultantly, the braking performances as well as rolling-resistance and wear resistance were almost same with those of Examples 2 and 5. Nevertheless, the hardness was high at low temperature, and hence, Examples 9 and 10 were considered to be slightly inferior in the braking performance on ice-covered-road.

Figure 2:
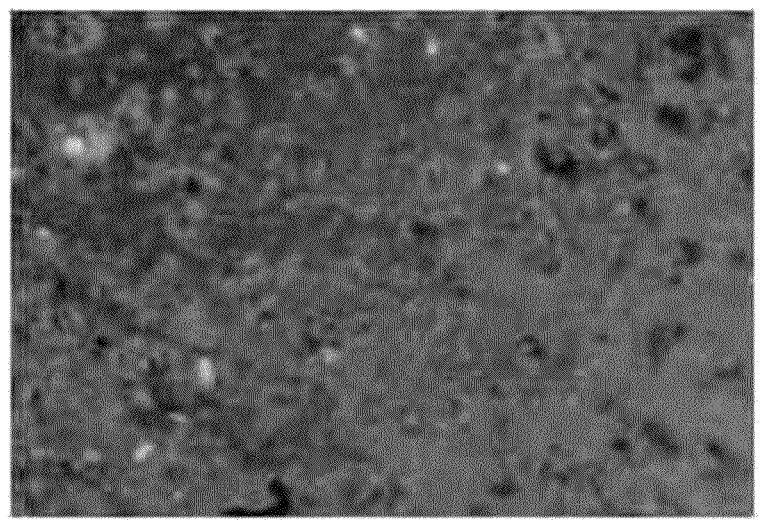
Figure 3:
FIGS. 3-4 are similar microscopic photographs on cut-through surfaces of vulcanized samples of Comparative example 2, respectively for its first and second lots.
Figure 4:

Additionally, the rubber compositions of Example 1 and Comparative example 2 were vulcanized and modified in a manner same as the tire for testing in the above. And, cut-through surfaces of obtained samples were observed by a microscope of 200 magnifications (200×). Thus obtained microphotographs are shown as FIGS. 1-4. Two lots of samples were made for each of the Example 1 and Comparative example 2; and FIGS. 1-2 show microphotographs of the Example 1 while FIGS. 3-4 show microphotographs of the Comparative example 2.

These microphotographs indicate an area having width of about 1.5 mm and length of about 2.0 mm. Microvoids in the vulcanized rubber appear in microphotographs as near-circular or oval dots. In FIG. 1, arrows are attached on several of the microvoids.

The samples of the Example 1 have been revealed to have microvoids, average diameter of which is in a range of 40 μm to 50 μm. Contrary to these, the samples of the Comparative example 2 have been revealed to have no microvoids.

Pneumatic tires according to the invention may be mounted and used for various kinds of vehicles such as passenger cars and light trucks as well as trucks and buses.

What is claimed is:

1. A rubber composition for tire comprising:
   a diene rubber component consisting of natural rubber and/or other diene rubber; and
   a powder of carboxymethyl cellulose having a degree of etherification in the range of 0.1 to 0.8,
   wherein the amount of the powder of carboxymethyl cellulose is in the range of 0.1-30 mass parts relative to 100 mass parts of the diene rubber component, and
   the powder of carboxymethyl cellulose retains a fiber form that is derived from cellulose raw material.

2. The rubber composition according to claim 1, wherein the degree of etherification of the carboxymethyl cellulose is in a range of 0.2 to 0.

3. The rubber composition according to claim 1, wherein average particle diameter of said powder is in a range of 20 μm to 100 μm.

4. The rubber composition according to claim 1, wherein microvoids having average diameter in a range of 30 μm to 70 μm are formed at a time of vulcanization and molding by heating in a range of 140° C. to 180° C.

5. The rubber composition according to claim 1, wherein viscosity of 1% aqueous solution of the carboxymethyl cellulose is in a range of 10 to 200 mPa·sec.

6. The rubber composition according to claim 1, wherein the diene rubber component has 40 to 60 mass % of natural rubber and/or isoprene rubber.

7. The rubber composition according to claim 1, wherein a water content of the powder of hydrophilic modified cellulose at a time of adding it into the rubber component is in a range of 1% to 8%.

8. The rubber composition according to claim 1, wherein the rubber composition is adopted for a tread rubber part of a studless tire.

9. A studless tire comprising a tread rubber part, wherein the tread rubber part comprises the rubber composition according to claim 1.

10. The studless tire according to claim 9, wherein the tread rubber part has microvoids that have average diameter in a range of 30 μm to 70 μm.

11. The studless tire according to claim 9, wherein the powder of carboxymethyl cellulose in the tread rubber part retains a fiber form that is derived from cellulose raw material.

\* \* \* \* \*